United States Patent [19]

Kanda

[11] Patent Number: 5,483,514
[45] Date of Patent: Jan. 9, 1996

[54] OPTICAL INFORMATION RECORDING AND/OR REPRODUCING APPARATUS

[75] Inventor: Shigeto Kanda, Inagi, Japan

[73] Assignee: Canon Kabushiki Kaisha, Tokyo, Japan

[21] Appl. No.: 245,649

[22] Filed: May 18, 1994

[30] Foreign Application Priority Data

May 20, 1993 [JP] Japan .................................. 5-139819

[51] Int. Cl.⁶ ........................................................ G11B 20/00
[52] U.S. Cl. ............................ 369/124; 369/99; 369/100; 369/110; 369/126; 369/44.25
[58] Field of Search ........................... 369/116, 114, 369/124, 99, 100, 110, 126, 44.25

[56] References Cited

U.S. PATENT DOCUMENTS

| | | | |
|---|---|---|---|
| 5,036,505 | 7/1991 | Gleim | 369/44.25 |
| 5,283,775 | 2/1994 | Finkelstein et al. | 369/124 |
| 5,339,302 | 8/1994 | Takahashi et al. | 369/124 |

FOREIGN PATENT DOCUMENTS 63-9036  1/1988  Japan .
1-279431  11/1989  Japan .

*Primary Examiner*—Viet Q. Nguyen
*Attorney, Agent, or Firm*—Fitzpatrick, Cella, Harper & Scinto

[57] ABSTRACT

In an optical information recording and/or reproducing apparatus, information is recorded by applying a beam of light to an optical recording medium and/or the recorded information is reproduced by receiving the reflected light of a beam of light applied to the optical recording medium by a photosensor divided into a plurality of sections. The apparatus has a subtractor for subtracting a plurality of signals from the photosensor divided into a plurality of sections, dividing means for dividing a part of a photocurrent from the photosensor into a predetermined frequency component and a predetermined high frequency component, amplifying means for amplifying the signal of the low frequency component and the signal of the high frequency component produced by the dividing means, an adder for adding the both signals amplified by the amplifying means, and a divider for dividing a subtraction signal obtained by the subtractor by an addition signal obtained by the adder to thereby normalize a servo signal.

10 Claims, 4 Drawing Sheets

OPTICAL INFORMATION RECORDING AND/OR REPRODUCING APPARATUS

BACKGROUND OF THE INVENTION

1. Field of the Invention

This invention relates to an optical information recording-reproducing apparatus for recording information on and/or reproducing information from an optical recording medium such as an optical disc.

2. Related Background Art

FIG. 1 of the accompanying drawings schematically shows the construction of an optical disc apparatus according to the prior art. In FIG. 1, reference numeral 21 designates an optical disc which is an information recording medium. The optical disc 21 is placed on a turntable and is rotatively driven by a spindle motor 22. An optical head 23 is provided below the optical disc 21 to be movable in the radial direction of the optical disc and a beam of light is emitted from a semiconductor laser 24 contained in the optical head 23 toward the optical disc 21. The emitted beam of light is collimated by a collimator lens 25, is transmitted through a beam splitter 26 and is imaged as a micro light spot on the optical disc 21 by an objective lens 27. The recording or reproduction of information is effected on the optical disc 21 by the beam of light.

The light reflected by the optical disc 21 passes again through the objective lens 27, and thereafter is separated from the incident beam of light by the beam splitter 26. The reflected light thus separated passes through an anamorphic optical system 29 in which the imaging position differs between two directions orthogonal to each other, and is received by a photoelectric conversion element 30. The photoelectric conversion element 30 comprises a plurality of optical sensors, and the output current of these optical sensors is converted into a voltage by a signal processing circuit 31, and a focusing error signal and a tracking error signal are produced from the converted voltage by an error signal detection circuit 40.

The focusing error signal is for accurately focusing the beam of light applied to the optical disc 21 on the disc. An actuator 28 provided in the optical head 23 is controlled by this focusing error signal, and the objective lens 27 is driven in the direction of the optical axis thereof by this control, whereby focusing control is effected. The tracking error signal is for controlling so that the beam of light may accurately trace information tracks formed concentrically or spirally on the optical disc 21. That is, this tracking error signal is fed back to the actuator 28 and drives the objective lens 27 in a direction across the information tracks, whereby tracking control is effected.

By the way, in an apparatus of the type capable of recording such as the optical disc apparatus as shown in FIG. 1, the light quantity of the beam of light applied to the disc differs between during writing and during reading-out and therefore, the quantity of reflected light from the surface of the disc also differs. Thus, even if the amount of tracking error and the amount of focusing error are the same, the signal gain of a servo system will differ depending on the operation mode of the apparatus, and this has led to the problem of causing a difference in the sensitivity of the servo system. So, generally, it is practised to provide a servo AGC (automatic gain control) circuit for controlling the servo gain constantly and stabilize the sensitivity of the servo system. Also, in an apparatus exclusively for reproduction such as a CD-ROM, the above-mentioned AGC circuit is effective when reflectance is irregular depending on the recording medium.

FIG. 2 of the accompanying drawings shows an example of such servo AGC circuit. In FIG. 2, reference numeral 1 designates a two-division photodetector for detecting a reflected light from the optical disc. Here is shown an example of tracking servo. The two-division photodetector 1 corresponds to the photoelectric conversion element 30 of FIG. 1 and is divided into detection elements 1a and 1b. The detection signals A and B of the detection elements 1a and 1b of the two-division photodetector 1 are outputted to a subtractor 2 and an adder 3, respectively, and the difference (A−B) between the detection signals A and B is outputted from the subtractor 2. On the other hand, the sum (A+B) of the detection signals A and B is outputted from the adder 3. The outputs of the subtractor 2 and adder 3 are divided by a divider 4, which outputs K(A+B)/(A+B), where K is a division coefficient. The difference (A—B) between the detection signals A and B of the detection elements 1a and 1b is normalized by the sum (A+B) of the detection signals A and B which corresponds to the total quantity of received light so that the relative value of the difference may not vary even if the total quantity of received light varies. Accordingly, even if as previously described, the quantity of reflected light from the disc varies during writing and during reading-out, the gain of the servo error signal becomes constant and the sensitivity of the servo system can be stabilized. The output of the adder 3 reflects the quantity of reflected light modulated by an emboss pit preformated on the disc and therefore, by an emboss signal obtained therefrom, the address of an information sector and the starting point thereof are detected.

In the servo AGC circuit shown in FIG. 2, assuming that for example, the number of revolutions of the optical disc is 3600 rpm, to effect tracking servo in which the light spot applied onto the optical disc is made to follow the tracks, a frequency band of about 5 kHz from DC is necessary as the servo error signal. Also, when shift is made from the reproducing operation to the recording operation or from the recording operation to the reproducing operation, the quantity of light applied to the optical disc varies suddenly and therefore, to compensate for it so as not to affect the servo system, the output signal of the adder 3 as the denominator signal of the divider 4 need have a band of several hundreds of kHz.

Further, to prevent the DC-like gain fluctuation of the tracking servo, the DC offset of the output of the adder 3, particularly the drift thereof, need be suppressed to a small value. On the other hand, as the emboss signal, a frequency band of about 100 kHz to about 20 MHz is necessary when for the purpose of sector identification or address identification, an optical disc of 2–7 conversion and pit position recording format is rotated at 3600 rpm as described, for example, in ISO, IEC/JTC1 10090. Further, in the case of the pit edge recording and 1–7 conversion format required in the future to make recording density higher, the frequency band of the emboss signal ranges even from several kHz to several tens of MHz. Thus, heretofore, a wide frequency band from DC to several tens of MHz and a small offset voltage have been required of the adder used in the servo AGC circuit and therefore, manufacturing accuracy has become severe, and this has been a factor which increases the costs of the apparatus.

SUMMARY OF THE INVENTION

It is the object of the present invention to solve the above-noted problems peculiar to the prior art and to provide an optical information recording and/or reproducing apparatus which can use an adder which is not a special adder of a wide frequency band and can be manufactured correspondingly inexpensively.

The above object of the present invention is achieved by an optical information recording and/or reproducing apparatus for effecting recording of information by applying a beam of light to an optical recording medium and/or effecting reproduction of information by receiving a reflected light of a beam of light applied to the optical recording medium by a photosensor divided into a plurality of sections, the apparatus having:

- subtracting means for subtracting a plurality of signals from the photosensor divided into a plurality of sections;
- dividing means for dividing a part of a photocurrent from the photosensor into a predetermined low frequency component and a predetermined high frequency component;
- amplifying means for amplifying the signal of the low frequency component and the signal of the high frequency component produced by the dividing means;
- adding means for adding the both signals amplified by the amplifying means; and
- divider means for dividing a subtraction signal obtained by the subtracting means by an addition signal obtained by the adding means to thereby normalized a servo signal.

DESCRIPTION OF THE PREFERRED EMBODIMENTS

Figure 1:
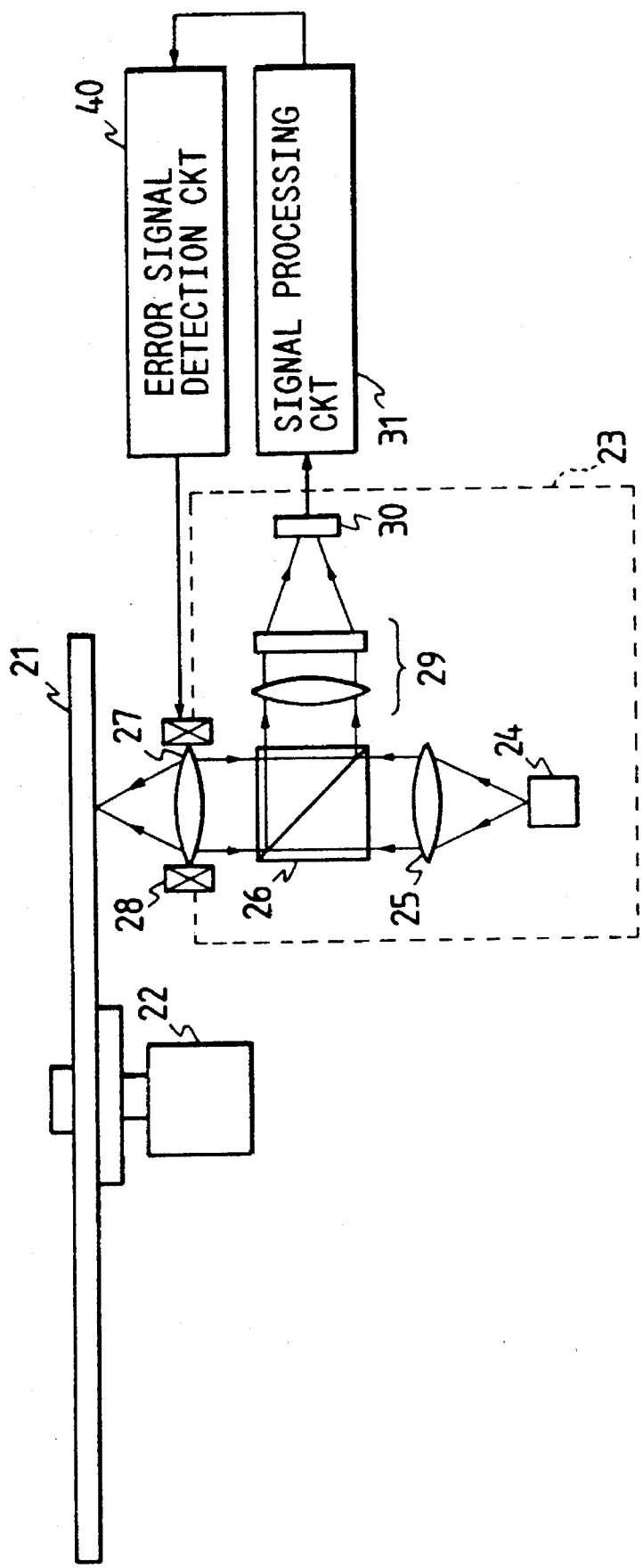
FIG. 1 schematically shows the construction of a popular optical disc apparatus.
Figure 2:
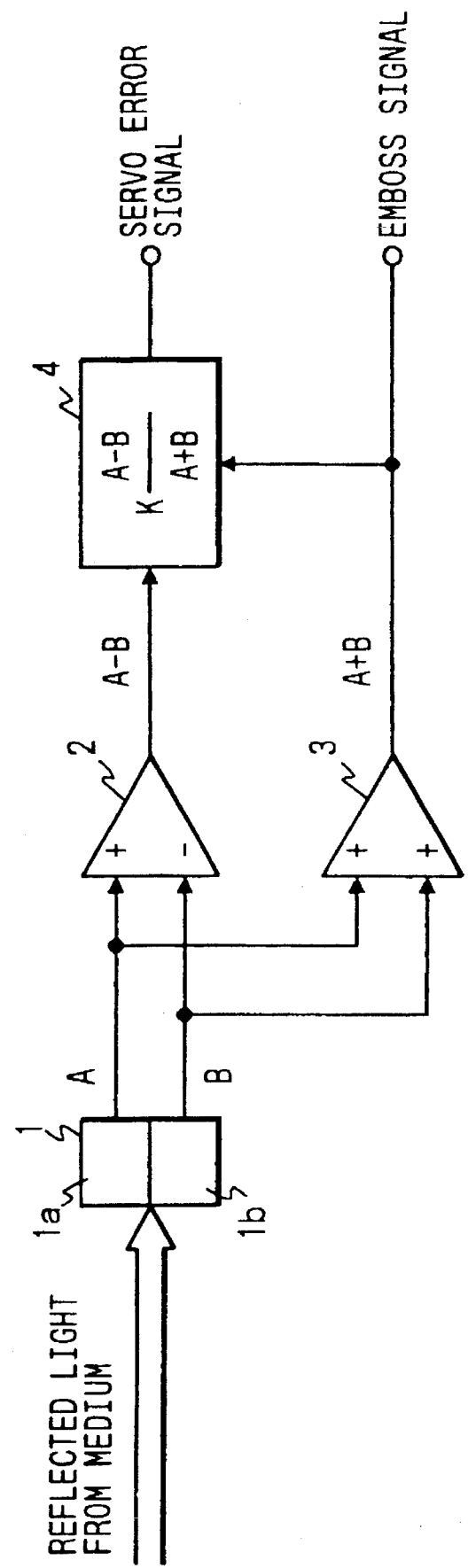
FIG. 2 shows the construction of a prior-art servo AGC circuit.
Figure 3:
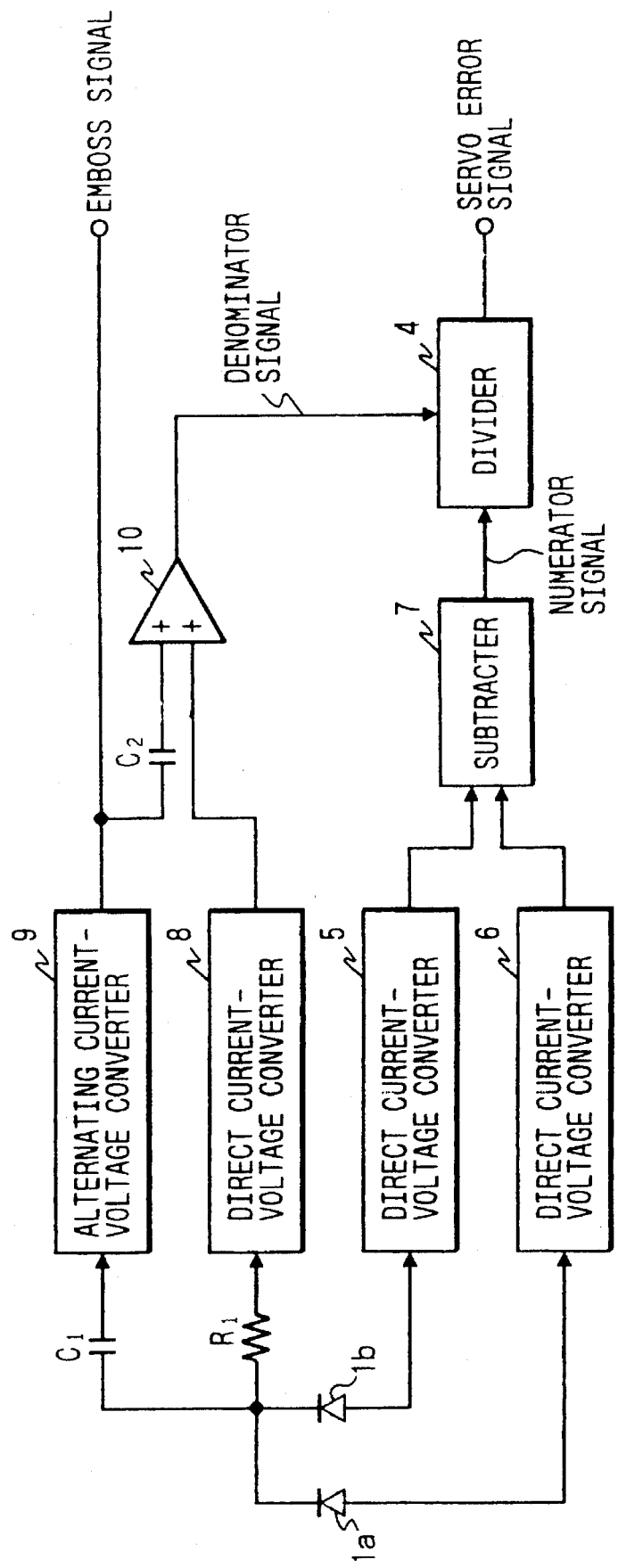
FIG. 3 is a block diagram showing an embodiment of the optical information recording-reproducing apparatus of the present invention.

Some embodiments of the present invention will hereinafter be described in detail with reference to the drawings. FIG. 3 is a block diagram showing an embodiment of the optical information recording reproducing apparatus of the present invention. Herein, description will be made with tracking servo taken as an example of a servo circuit. In FIG. 3, reference characters $1a$ and $1b$ designate the two detection elements of the two-division photodetector 1 shown in FIG. 2. Light reflected from an optical disc (not shown) is detected by the detection elements $1a$ and $1b$, and a servo error signal and an emboss signal are produced on the basis of the detection signals of the detection elements $1a$ and $1b$. Reference numerals 5 and 6 denote direct current-voltage converters which are amplifying means connected to the anodes of the detection elements $1a$ and $1b$, respectively. The photocurrents of the detection elements $1a$ and $1b$ are converted into voltage signals by the direct current-voltage converters 5 and 6, respectively. Reference numeral 7 designates a subtractor for taking the difference between the outputs of the direct current-voltage converters 5 and 6. The output of the subtractor 7 is outputted to a divider 4 as a numerator signal for normalizing a servo error signal (a tracking error signal). The divider 4 is the same as that shown in FIG. 1.

Reference numeral 8 denotes a direct current-voltage converter for introducing the detection signals of the detection elements $1a$ and $1b$ thereinto through a resistor $R_1$ and converting them into voltage signals, and reference numeral 9 designates an alternating current-voltage converter for introducing the detection signals of the detection elements $1a$ and $1b$ thereinto through a capacitor $C_1$ and converting them into voltage signals. The converters 8 and 9 both are a kind of amplifying means. The direct current-voltage converter 8 has a frequency band of DC to several hundreds of kHz, and the alternating current-voltage converter 9 has a frequency band of several kHz to several tens of MHz. The cathodes of the detection elements $1a$ and $1b$ are common to each other, and the two detection signals thereof are outputted to the direct current-voltage converter 8 and the alternating current-voltage converter 9 through the resistor $R_1$ and the filter of the capacitor $C_1$. Accordingly, in the direct current-voltage converter 8, the low-frequency component of the detection signal is current-voltage-converted, and in the alternating current-voltage converter 9, the high frequency component of the detection signal is current-voltage-converted. The output of the alternating current-voltage converter 9 is sent as an emboss signal to a signal processing circuit, not shown, in which the emboss signal is subjected to predetermined signal processing, whereby a sector detecting signal for detecting the head position of a sector, the address information of the sector, etc. are produced. Reference numeral 10 denotes an adder for adding the outputs of the direct current-voltage converter 8 and the alternating current-voltage converter 9. The output of the alternating current-voltage converter 9 is outputted to the adder 10 through a capacitor $C_2$. Also, the output signal of the adder 10 is outputted as a denominator signal to the divider 4, in which the numerator signal is divided by the denominator signal, whereby a normalized servo error signal is produced.

The specific operation of the present embodiment will now be described. When the photocurrents of the detection elements $1a$ and $1b$ of the two-division photodetector are $I_a$ and $I_b$, respectively, and the conversion coefficients of the direct current-voltage converters 5 and 6 are K, the outputs of the direct current-voltage converters 5 and 6 are $K \cdot I_a$ and $-K \cdot I_b$, respectively. On the other hand, the photocurrent $I_a + I_b$ of the detection elements $1a$ and $1b$ is frequency-divided by the resistor $R_1$ and the capacitor $C_1$, and a current $I_1$, of it which is shunted to the direct current-voltage converter 8 is $$I_1 = (I_a + I_b)/(1 + SC_1R_1). \tag{1}$$

Also, a current $I_2$ which is shunted to the alternating current-voltage converter 9 is $$I_2 = (I_a + I_b)/(1 + SC_1R_1). \tag{2}$$

Here, when the conversion coefficients of the direct current-voltage converter 8 and the alternating current-voltage converter 9 are K, the output voltage $V_1$ of the direct current-voltage converter 8 is $$V_1 = K(I_a + I_b)/(1 + SC_1R_1). \tag{3}$$

Also, the output voltage $V_2$ of the alternating current-voltage converter 9 is $$V_2 = K(I_a + I_b)/(SC_1R_1)/(1 + SC_1R_1). \tag{4}$$

The constants of the capacitor $C_1$ and the resistor $R_1$ are set such that a crossover frequency is e. g. 1 kHz, and the frequencies of the signals of the direct current-voltage converter 8 and the alternating current-voltage converter 9 are divided by this crossover frequency. Further, the alternating current-voltage converter 9 is comprised of an AC amplifier and therefore, no consideration need be paid to offset and the drift thereof.

The output signal of the alternating current-voltage converter 9 is sent through the capacitor $C_2$ to the adder 10, in which it is added to the output signal of the direct current-voltage converter 8. The capacitor $C_2$ is constructed as a high-pass filter having a cut-off frequency of 10 Hz which is sufficiently low as compared with the aforementioned crossover frequency which is 1 kHz, and the output signal of the alternating current-voltage converter 9 is outputted through this high-pass filter to the adder 10. Accordingly, the cut-off frequency is sufficiently low and therefore is not affected by the high-pass filter in the vicinity of the crossover frequency 1 kHz. Also, in the vicinity of the cut-off frequency, the output of the alternating current-voltage converter 9 is sufficiently attenuated and therefore, an output voltage $V_3$ obtained by the two output signals being added together in the adder 10 is $$V_3 = [K(I_a + I_b)/(1 + SC_1R_1)] + \qquad (5)$$
$$[K(I_a + I_b)(SC_1R_1)/(1 + SC_1R_1)]$$
$$= K(I_a + I_b).$$

The addition output obtained is sent as a denominator signal to the divider 4, in which a dividing process is effected by it and the numerator signal of the subtractor 7. An output voltage $V_4$ obtained by the division by the divider 4 is $$V_4 = -K(I_a - I_b)/K(I_a + I_b) \qquad (6)$$
$$= -(I_a - I_b)/(I_a + I_b)$$

and is produced as a servo error signal normalized by the total photocurrent of the two detection elements $1a$ and $1b$ of the two-division photodetector. The servo error signal obtained is sent to the next stage servo circuit (not shown), and the servo control (tracking control) of the beam of light applied to the optical disc is effected on the basis of this servo signal.

In the present embodiment, the detection signals of the detection elements of the two-division photodetector are divided into a predetermined low frequency component and a predetermined high frequency component, and the emboss signal preformated in the optical disc is reproduced on the basis of the signal of the high frequency component, whereby the band of a high frequency required of the adder can be made unnecessary. That is, in the prior art, as previously described, to reproduce the emboss signal, a frequency band of several kHz to several tens of MHz has been necessary, while in the present embodiment, the emboss signal is directly reproduced by the high frequency component of the signals of the detection elements so that the high frequency component may not pass through the adder and therefore, the adder does not require such a high band that reproduces the emboss signal and only a frequency band necessary for servo control suffices. Also, since the alternating current-voltage converter 9 is an AC amplifier, no consideration need not be given to the offset of the adder and the drift thereof and further, the output of the alternating current-voltage converter 9 is extracted through the high-pass filter and the signal thereof and the signal of the direct current-voltage converter 8 are added together, whereby the frequency component necessary for servo control can be reliably taken out. Accordingly, the adder need not be a special one having a wide band and a small offset voltage, but may be an ordinary one and therefore, it becomes possible to use an inexpensive adder and the apparatus can be made correspondingly inexpensive.

Figure 4:
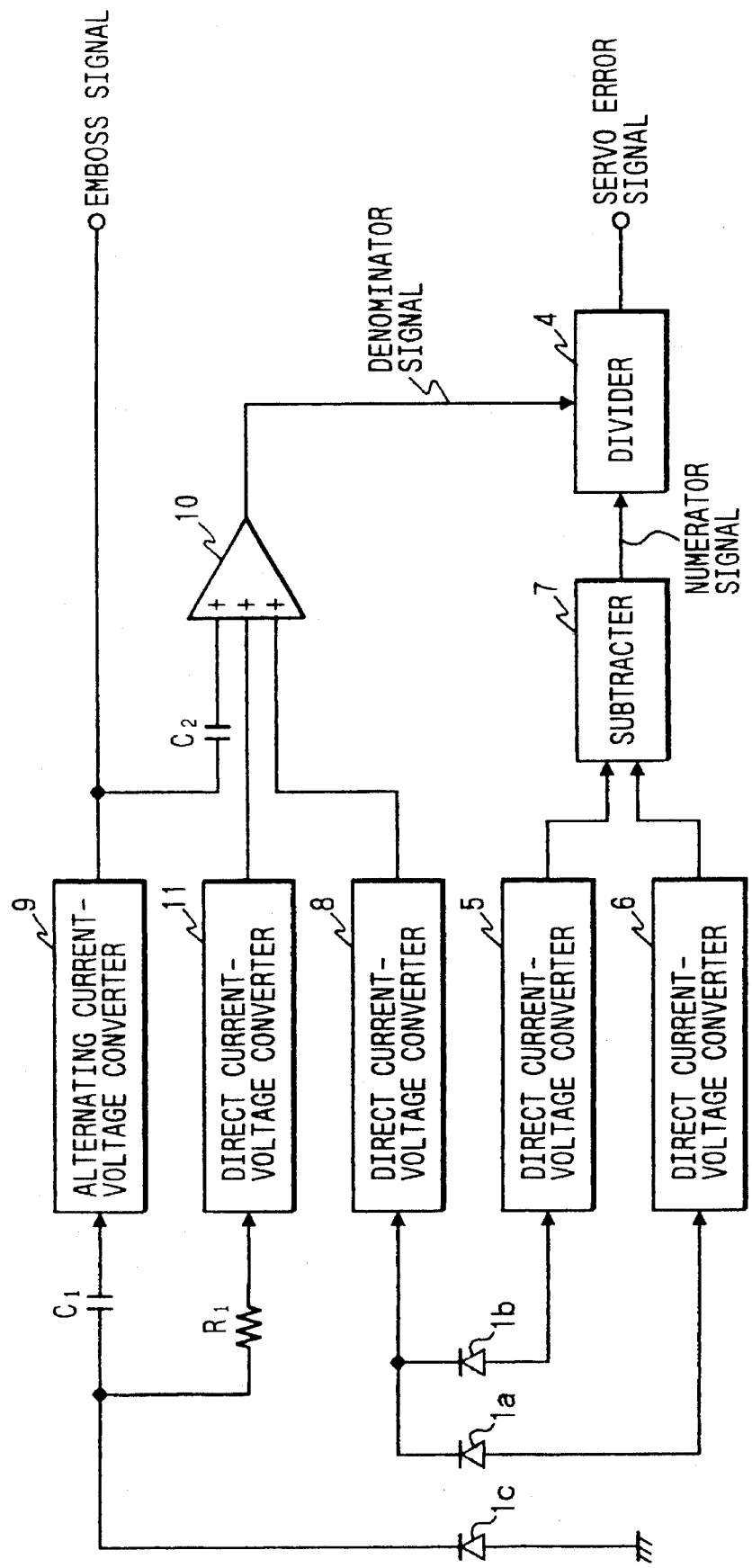
FIG. 4 is a block diagram showing another embodiment of the present invention.

FIG. 4 is a block diagram showing another embodiment of the present invention. In FIG. 4, the same portions as those in the embodiment of FIG. 3 are given the same reference characters and need not be described. This embodiment uses a three-division photodetector as the multi-division photodetector, and one of the detection elements thereof is used exclusively for the reproduction of the emboss signal. A detection element $1c$ is exclusively for the reproduction of the emboss signal, and the photocurrent of the detection element $1c$ is frequency-divided at a crossover frequency of e.g. 1 kHz by the resistor $R_1$ and the capacitor $C_1$. The high frequency component is converted into a voltage signal by the alternating current-voltage converter 9, and the signal obtained is used for the reproduction of the emboss signal. Also, the signal of the alternating current-voltage converter 9 is outputted to the adder 10 through the capacitor $C_2$ provided as a high-pass filter, and added to the signals of another direct current-voltage converter 11 and the direct current-voltage converter 8 for converting the photocurrents of the detection elements $1a$ and $1b$ into a voltage signal. The addition signal obtained is sent as a denominator signal to the divider 4 in which a dividing process is effected by it and the numerator signal of the subtractor 7, whereby a servo error signal is normalized. Thus, again in the present embodiment, the photocurrent of the photodetector is frequency-divided into a high frequency component and a low frequency component, whereby just as in the embodiment of FIG. 3, it becomes possible to use not a special adder of a wide frequency band, but an ordinary adder, and it becomes possible to make the apparatus inexpensive.

In the above-described embodiments, there has been shown are example in which a tracking error signal is produced as the servo error signal of the servo control circuit, but in focus servo as well, the photocurrent of the photosensor is likewise frequency-divided, whereby it becomes possible to use not a special adder of a wide frequency band but an ordinary adder.

As described above, according to the present invention, the photocurrent of the divided photosensor is frequency-divided into a predetermined high frequency component and a predetermined low frequency component, whereby the frequency band of the signal of the photosensor can be divided into two, i.e., one for the reproduction of the emboss signal and one for servo control, and the wide frequency band which has heretofore been necessary for the adder can be restricted to only a low frequency band necessary for servo control. Accordingly, not a special adder of a wide frequency band but an ordinary inexpensive adder can be used as the adder heretofore used in the servo AGC circuit, and this leads to the effect that the apparatus can be made correspondingly inexpensive.

What is claimed is:

1. A detection apparatus for detecting light reflected by an optical recording medium, comprising:

a photosensor for receiving said light reflected by said optical recording medium, said photosensor including a first detecting portion and a second detecting portion;

first current-voltage conversion means for converting a photocurrent from said first detecting portion and a photocurrent from said second detecting portion into voltages, said first current-voltage conversion means including a first current-voltage converter and a second current-voltage converter;

subtracting means for calculating a difference between an output from said first current-voltage converter and said output from said second current-voltage converter;

dividing means for dividing a photocurrent from said photosensor into a low frequency component and a high frequency component;

second current-voltage conversion means for converting a photocurrent having said low frequency component and a photocurrent having said high frequency component into voltages, said second current-voltage conversion means including a third current-voltage converter and a fourth current-voltage converter;

adding means for adding an output from said third current voltage converter and an output from said fourth current-voltage converter; and divider means for dividing an output from said subtracting means by an output from said adding means to thereby produce a normalized servo error signal.

2. An apparatus according to claim 1, wherein information recorded on said optical recording medium is reproduced on the basis of said output from said fourth current-voltage converter.

3. An apparatus according to claim 1, wherein said third current-voltage converter converts said photocurrent having said low frequency component into a first voltage and said fourth current-voltage converter converts said photocurrent having said high frequency component into a second voltage.

4. An apparatus according to claim 1, further comprising a capacitor provided between said fourth current-voltage converter and said adding means, and wherein said capacitor functions as a high-pass filter having a cutoff frequency sufficiently lower than a boundary frequency of said low frequency component and said high frequency component.

5. An optical information recording/reproducing apparatus for effecting at least one of recording information or reproducing information by irradiating an optical recording medium with a light beam, comprising:

irradiation means for irradiating said optical recording medium with a light beam;

a photosensor for receiving light reflected by said optical recording medium, said photosensor including a first detecting portion and a second detecting portion;

first current-voltage conversion means for converting a photocurrent from said second detecting portion and a photocurrent from said second detecting portion into voltages, said first current-voltage conversion means including a first current-voltage converter and a second current-voltage converter;

subtracting means for calculating a difference between an output from said first current-voltage converter and an output from said second current-voltage converter;

dividing means for dividing a photocurrent from said photosensor into a low frequency component and a high frequency component;

second current-voltage conversion means for converting a photocurrent having said low frequency component and a photocurrent having said high frequency component into voltages, said second current voltage conversion means including a third current-voltage converter and a fourth current-voltage converter;

adding means for adding an output from said third current-voltage converter and an output from said fourth current-voltage converter; and divider means for dividing an output from said subtracting means by an output from said adding means to thereby produce a normalized servo error signal.

6. An apparatus according to claim 4, wherein said boundary frequency is 1 Khz.

7. an apparatus according to claim 5, wherein said third current-voltage converter converts said photocurrent having said low frequency component into a first voltage and said fourth current-voltage converter converts said photocurrent having said high frequency component into a second voltage.

8. An apparatus according to claim 7, wherein information recorded on said optical recording medium is reproduced on the basis of said output from said fourth current-voltage converter.

9. An apparatus according to claim 7, further comprising a capacitor provided between said fourth current-voltage converter and said adding means, and wherein said capacitor functions as a high-pass filter having a cutoff frequency sufficiently lower than a boundary frequency of said low frequency component and said high frequency component.

10. An apparatus according to claim 9, wherein said boundary frequency is 1 Khz.

* * * * *

UNITED STATES PATENT AND TRADEMARK OFFICE
CERTIFICATE OF CORRECTION

PATENT NO. : 5,483,514
DATED : January 9, 1996
INVENTOR(S): Kanda

Page 1 of 2

It is certified that error appears in the above-indentified patent and that said Letters Patent is hereby corrected as shown below:

[57] ABSTRACT:

Line 7, "subtractor" should read --subtracter--; and
Line 17, "subtractor" should read --subtracter--.

COLUMN 2:

Line 11, "subtractor 2" should read --subtracter 2--;
Line 13, "subtractor 2." should read --subtracter 2.--;
Line 15, "subtractor 2" should read --subtracter 2--; and
Line 28, "preformated" should read --preformatted--.

COLUMN 3,

Line 28, "normalized" should read --normalize--;
Line 64, "subtractor" should read --subtracter--; and
Line 66, "subtractor 7" should read --subtracter 7--.

COLUMN 4:

Line 48, "$I_1$," should read --$I_1$--; and

Line 56, "$I_2 = (I_a+I_b)/(1+SC_1R_1)$. (2)" should read

--$I_2 = (I_a+I_b)(SC_1R_1)/(1+SC_1R_1)$. (2)--.

UNITED STATES PATENT AND TRADEMARK OFFICE
CERTIFICATE OF CORRECTION

PATENT NO. : 5,483,514          Page 2 of 2
DATED      : January 9, 1996
INVENTOR(S) : Kanda It is certified that error appears in the above-indentified patent and that said Letters Patent is hereby corrected as shown below:

COLUMN 5:

Line 49, "preformated" should read --preformatted--; and
Line 63, "not" should be deleted.

COLUMN 6:

Line 37, "are" should read --an--.

COLUMN 8:

Line 2, "second" should read --first--; and
Line 27, "an" should read --An--.

Signed and Sealed this

Twenty-fifth Day of June, 1996

Attest:

BRUCE LEHMAN

Attesting Officer          Commissioner of Patents and Trademarks